US005537200A

United States Patent [19]
Kumagai et al.

[11] Patent Number: 5,537,200
[45] Date of Patent: Jul. 16, 1996

[54] ELECTRONIC LEVELING APPARATUS HAVING A LEVELING STAFF DETECTION FUNCTION, AND LEVELING STAFF USED WITH THE SAME

[75] Inventors: Kaoru Kumagai; Shinji Kawashima; Kiichi Furuya; Fumio Ohtomo, all of Tokyo, Japan

[73] Assignee: Kabushiki Kaisha TOPCON, Tokyo, Japan

[21] Appl. No.: 197,074

[22] Filed: Feb. 16, 1994

[30] Foreign Application Priority Data

Feb. 16, 1993 [JP] Japan .................................. 5-051342

[51] Int. Cl.⁶ .................. G01C 3/08; G01C 21/02; G01C 15/02
[52] U.S. Cl. .................... 356/4.01; 33/293; 356/4.03; 356/4.08; 356/139.08
[58] Field of Search .................... 356/4.01, 4.03, 356/4.08, 139.06, 139.07, 139.08; 33/293–295

[56] References Cited

U.S. PATENT DOCUMENTS

| | | | |
|---|---|---|---|
| 3,790,277 | 2/1974 | Hogan | 356/4.08 |
| 4,029,415 | 6/1977 | Johnson | 356/4.08 |
| 4,488,050 | 12/1984 | Iwafune | 33/293 |
| 4,673,287 | 6/1987 | Rickus . | |
| 4,715,714 | 12/1987 | Gaechter et al. | 356/375 |

Primary Examiner—Stephen C. Buczinski
Attorney, Agent, or Firm—Brumbaugh, Graves, Donohue & Raymond

[57] ABSTRACT

An electronic leveling apparatus and associated leveling staff are capable of measuring the height difference of the positions automatically through the opto-electric conversion of the image of a pattern formed on the leveling staff. The apparatus has a turning drive means for turning it on a horizontal plane, a light emission means for emitting a light beam to the outside, a light reception means for receiving a reflected light of the emitted light beam, and a signal processor for controlling the turning drive means in response to the received signal so that the apparatus is oriented to the leveling staff automatically.

5 Claims, 14 Drawing Sheets

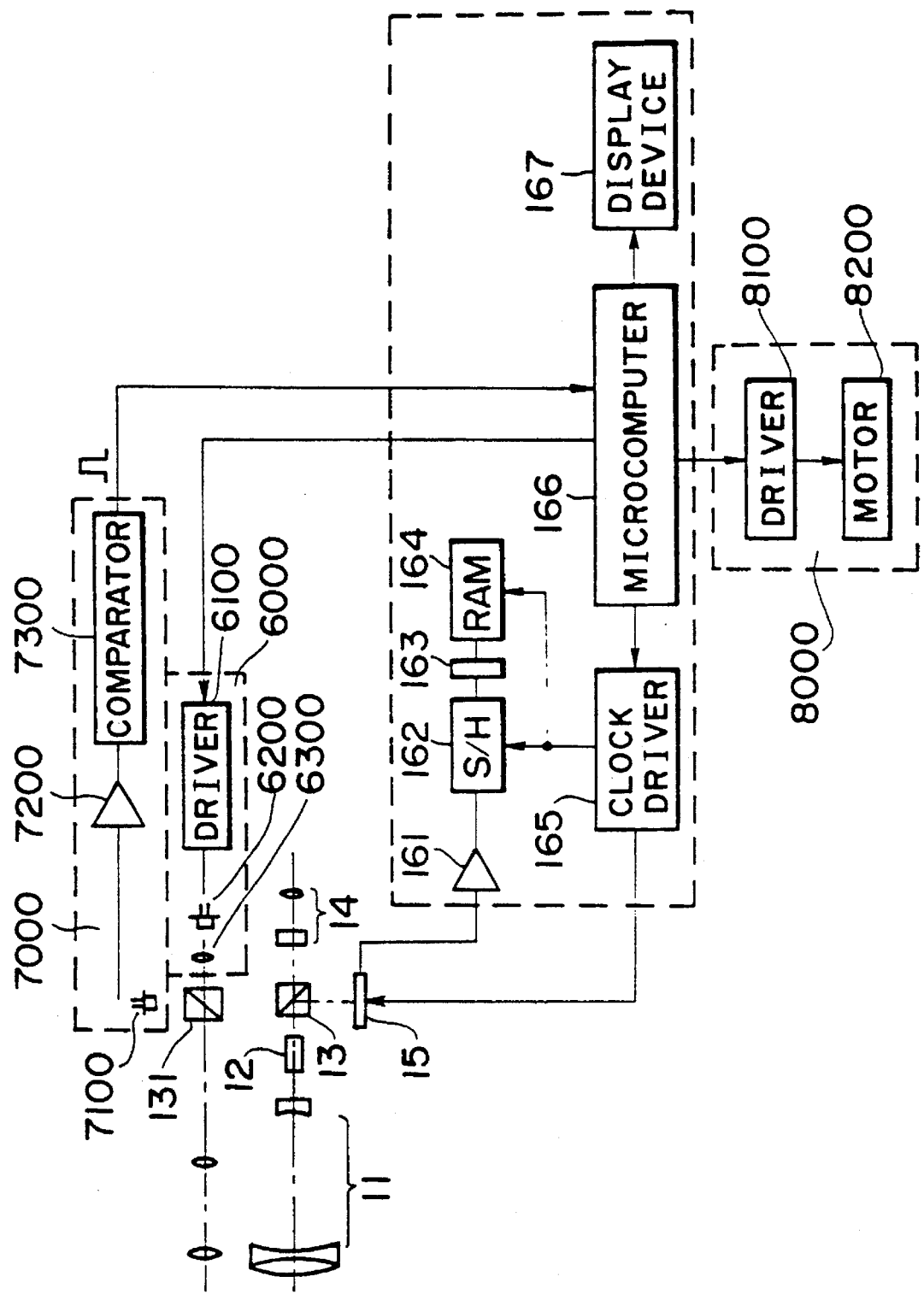

→ ELECTRONIC LEVEL TURNING DIRECTION

FIG. 15
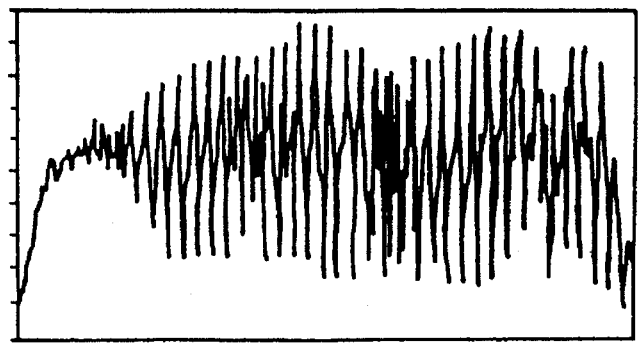
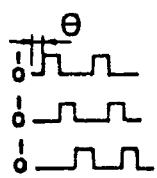
← PATTERN PITCH
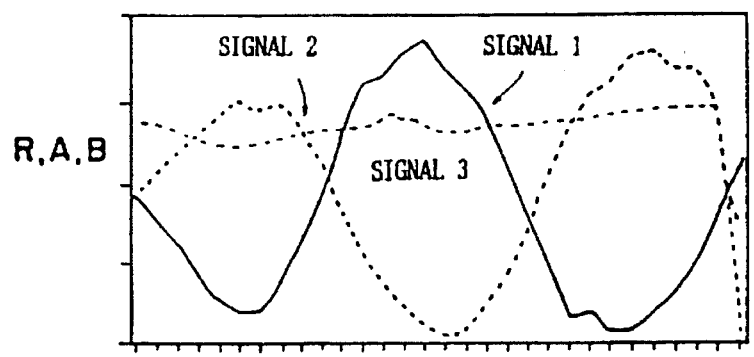
R(0) R(1) ------
A(0) A(1) ———
B(0) B(1) ·······
FIG. 16
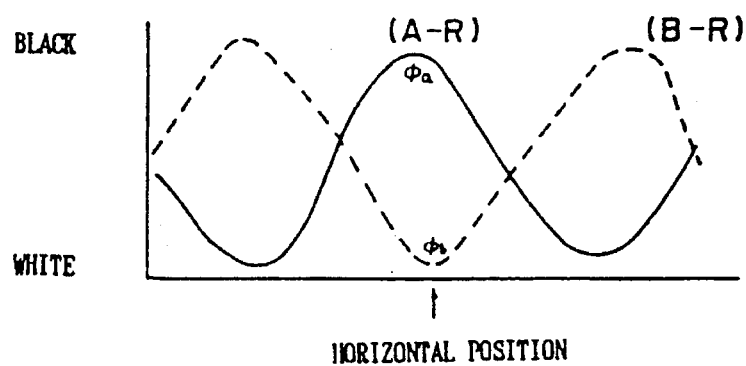
HORIZONTAL POSITION ns5,537,200

ELECTRONIC LEVELING APPARATUS HAVING A LEVELING STAFF DETECTION FUNCTION, AND LEVELING STAFF USED WITH THE SAME

BACKGROUND OF THE INVENTION

The present invention relates to an electronic leveling apparatus and associated leveling staff capable of measuring the height difference and distance between the positions automatically through the opto-electric conversion of the image of a pattern formed on the leveling staff, and particularly to an electronic leveling apparatus and associated leveling staff, with the apparatus having a drive means for turning it on a horizontal plane to detect the staff and being operative to focus the pattern image of the staff automatically.

For the direct measurement of the ground level or the like, a set of leveling unit and leveling staff has been used conventionally. The leveler uses the leveling unit to view the scale on the leveling staff and measures the difference of height between the two positions. However, this traditional leveling scheme involves a read error made by the leveler. With the intention of overcoming the leveler's read error, electronic leveling systems in which the scale on the leveling staff is read electronically have been developed. One electronic leveling system is designed to emit a prescribed optical signal from the leveling staff and receive and identify the optical signal on the leveling unit thereby to read the scale on the leveling staff.

The applicant of the present invention has developed an electronic leveling apparatus that is operative to determine the height difference between positions electronically, as described in U.S. patent application Ser. No. 08/082,082 now abandoned. This electronic leveling apparatus uses a leveling staff 2 having a cyclic arrangement of a pattern set, with each block consisting of a first pattern A, second pattern B and third pattern R at a constant pitch of p, as shown in FIG. 2.

The lowest pattern block is defined to be block 0 which includes R(0), A(0) and B(0), the next block is block 1 including R(1), A(1), B(1), the next block is block 2 including R(2), A(2), B(2), and so on. A reference signal is produced in correspondence to the constant pattern pitch p. The third pattern R has a constant length of 8 mm for its black section, whereas the first pattern A has its length modulated to have a period of 600 mm and the second pattern B has its length modulated to have a period of 570 mm.

However, the above-mentioned electronic leveling apparatus for evaluating the height difference automatically requires the accurate visual sighting of the leveling staff by the leveler. This tedious sighting operation must be repeated each time the leveling staff is moved, which retards the improvement of the efficiency of leveling work.

BRIEF DESCRIPTION OF THE DRAWINGS

FIG. 1 is a block diagram showing the arrangement of the electronic level 1 based on the first embodiment of this invention.

FIG. 1 is a block diagram showing the electronic level 1 based on the second embodiment of this invention;

FIG. 14 FIG. 15 and FIG. 16 are diagrams used to explain the principle of long-distance measurement based on the first embodiment of invention;

DESCRIPTION OF THE PREFERRED EMBODIMENTS

The embodiments of this invention will be explained with reference to the drawings.

Figure 2A:
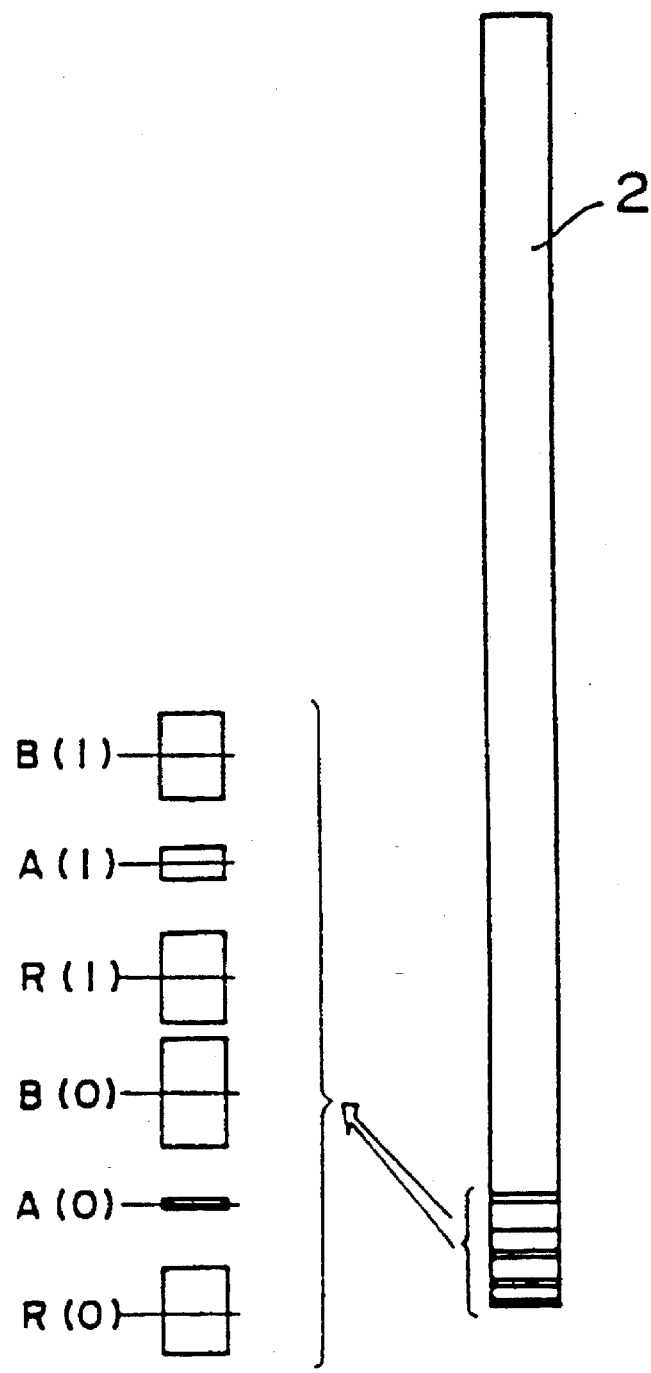
FIG. 2 is a diagram used to explain the leveling staff 2 use with the electronic level shown in FIG. 1.
Figure 2:
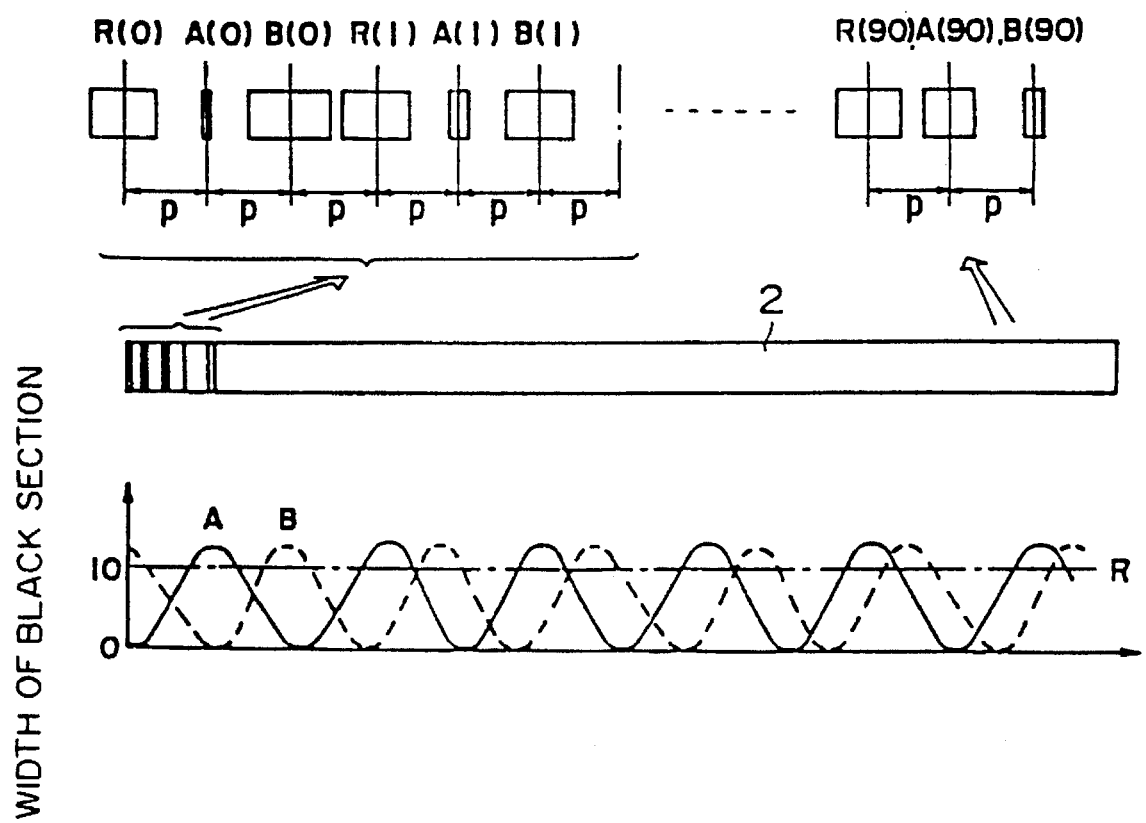
Figure 3:
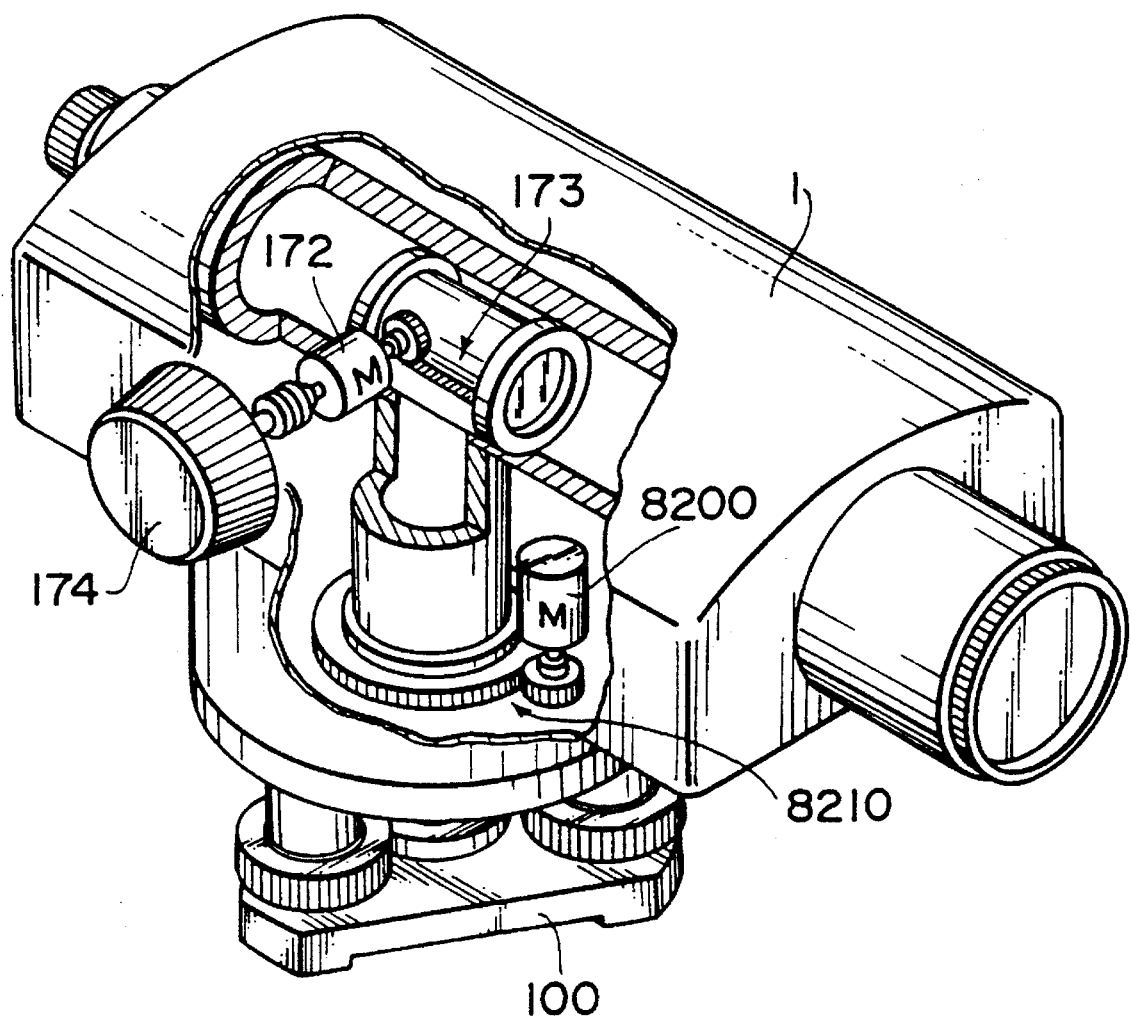
FIG. 3 is a perspective view of the electronic level 1 of the first embodiment.

The leveling system of the first embodiment consists of an electronic level 1 and a leveling staff 2 as shown in FIG. 1 through FIG. 3. The electronic level 1 is mounted on a tribrach 100 as shown in FIG. 3, and it consists of an optical system including an objective lens set 11, a compensator 12, a beam splitter 13 and an eyepiece set 14, a linear sensor 15, a computation means 16, a light emission means 6000, a light reception means 7000 and a turning drive means 8000, as shown in FIG. 1.

The objective lens set 11, which forms an image of the scale pattern of the leveling staff 2, consists of an objective lens and an internal lens which is moved to focus the image. The compensator 12 is an automatic mechanism for maintaining the sight line horizontal thereby to offset some inclination of the optical axis of the electronic level 1. The beam splitter 13 splits the incident light beam into two directions toward the eyepiece set 14 and the linear sensor 15. The eyepiece set 14 is used by the leveler to view the scale on the leveling staff 2.

The objective lens set 11 and eyepiece set 14 constitute a sighting optical system, and the objective lens set 11 and linear sensor 15 constitute a measuring optical system. The linear sensor 15 converts the pattern image formed by the objective lens set 11 into an electrical signal. The linear sensor 15, which is a CCD linear sensor in this embodiment, can be any optical sensor having an array of photodiodes of at least one dimension.

The computation means 16 consists of an amplifier 161, a sample-holding circuit 162, an A/D converter 163, a RAM 164, a clock driver 165 and a microcomputer 166, and it is connected with a display device 167.

The light emission means 6000, which emits a light beam to the outside of the apparatus, consists of an LED (light emitting diode) driver 6100, an LED 6200 and an emission optical system 6300. The LED driver 6100 activates the LED 6200 in response to the command of the microcomputer 166.

The light reception means 7000, which receives the reflected light of the light beam emitted by the light emission means 6000, consists of a photosensitive element 7100, an amplifier 7200 and a comparator 7300. The photosensitive element 7100 receives the return light beam and converts it into an electrical signal. Although a charge coupled device (CCD) is used in this embodiment, any other opto-electric transducing device may be employed. The return light beam is diverted to the optical system of the light reception means 7000 by a beam splitter 131.

The amplifier 7200 amplifies the detected signal of the photosensitive element 7100, and the comparator 7300 issues a control signal to the microcomputer 166 on detecting the prescribed level or higher, which indicates the light incident, of the signal provided by the photosensitive element 7100.

The turning drive means 8000 shown in FIG. 1 and FIG. 3 is intended to turn the electronic level 1 around its pivot on a horizontal plane, and it consists of a motor driver 8100 and a first motor 8200. The motor driver 8100 rotates the first motor 8200 in response to the command of the microcomputer 166, and the first motor 8200 turns the electronic level 1 through a reduction gear 8210.

Figure 6:
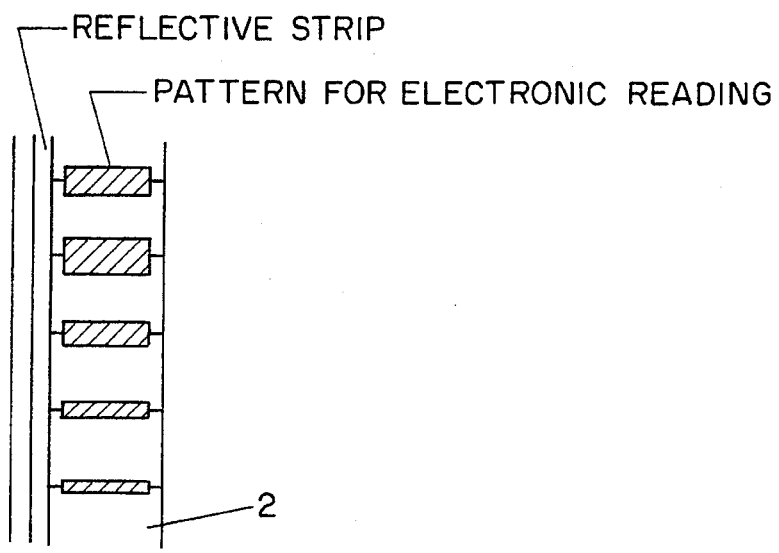
FIG. 6 a diagram used to explain the leveling staff 2 used with the electronic level 1 of this embodiment.

The leveling staff 2 used with the electronic level 1 has a cyclic arrangement of a pattern set for electronic reading, with each pattern set consisting of a first pattern A, second pattern B and third pattern R at a constant pitch of p, as shown in FIG. 2(a), (b). The leveling staff 2 has a further formation of a reflective strip 23 on the side of the pattern 21 as shown in FIG. 6. The reflective strip 23, which is a reflective tape in this embodiment, constitutes a reflector for reflecting a light beam in the direction opposite to the incident direction, and it reflects the light beam emitted by the light emission means 6000 of the electronic level 1.

Next, the principle of measurement of the leveling system arranged as described above will be explained.

Initially, the measurement of horizontal position of the leveling staff 2 will be explained. Since the first pattern A is modulated for the width of black section in a period of 600 mm, the pattern width $D_A$ for a modulation width of 0–10 mm is expressed as follows.

$$D_A = 5 \times (1 + \sin(2 \times \pi \times X/600 - \pi/2)) \quad (1)$$

where X takes 10 mm, 40 mm, 70 mm, and so on. Similarly, the second pattern B modulated in a period of 570 mm has its pattern width $D_B$ expressed as follows.

$$D_B = 5 \times (1 + \sin(2 \times \pi \times X/570 + \pi/2)) \quad (2)$$

where X takes 20 mm, 50 mm, 80 mm, and so on.

The first and second patterns are modulated with offset phases of $\pm \pi/2$ with the intention of simplifying the separation of the signals resulting from these patterns.

Since the first pattern A and second pattern B have slightly different periods, the same pattern appears at the distance which is the minimum common multiple of the periods, i.e., at a distance of 11400 mm which is the minimum common multiple of 600 mm and 570 mm in this embodiment. Accordingly, the signals produced from the first and second patterns have phase differences varying between 0 and $2\pi$ over the range of 0–11400 mm.

For the signals of the first and second patterns having phases of $\phi_A$ and $\phi_B$, respectively, the horizontal position H of the leveling staff 2 is expressed as follows.

$$H = 11400 \times ((\phi_B - \phi_A - \pi)/(2\pi)) \text{ mm} \quad (3)$$

Next, the computation of the distance between the electronic level 1 and leveling staff 2 will be explained.

The electronic level 1 reads the scale on the leveling staff 2, and the resulting signal is rendered the Fourier transformation. As shown in the power spectrum graph of FIG. 4, signal components are separated into a frequency component of the reference signal corresponding to the pattern pitch p, a frequency component of the first pattern A, a frequency component of the second pattern B, and a frequency component (having a period three times that of the reference signal) of a set (block) of the third pattern R, first pattern A and second pattern B. These spectral frequencies move downward as the distance between the electronic level 1 and leveling staff 2 reduces. Among the all signal components, the reference signal has the smallest period (it corresponds to the constant pattern pitch p).

Since the pattern pitch p is fixed, the distance between the electronic level 1 and leveling staff 2 can be calculated based on the formula of lens focus.

Figure 13:
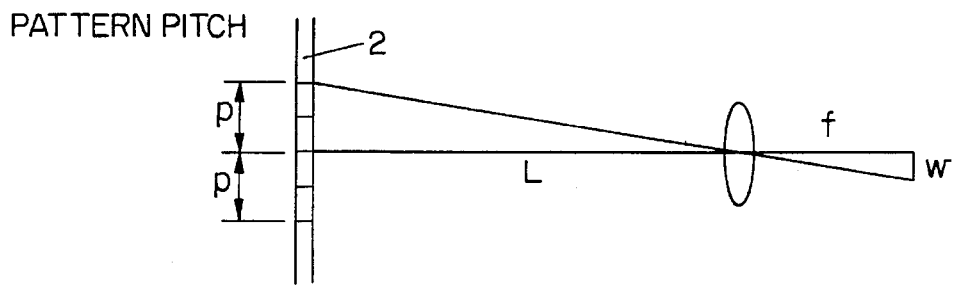
FIG. 13 is a diagram used to explain the principle of horizontal distance measurement.

Namely, as shown in FIG. 13 the lens produces an image width of w for the pattern pitch p, and the distance L between the level 1 and staff 2 is calculated from the distance d between the lens and image as follows.

$$L = d(p/w)$$

Since d is approximately equal to the focal distance f of the lens, $$L = d(p/w) \approx f(p/w)$$

With the linear sensor 15 having a pixel length of C and an output wavelength of k corresponding to the pattern pitch p, the image length w produced by the lens is expressed as w=Ck. Accordingly, the distance L between the level i and staff 2 is calculated approximately as follows.

$$L = (f/C \times k) \times (p) \quad (4)$$

Next, the principle of leveling will be explained.

Figure 14:
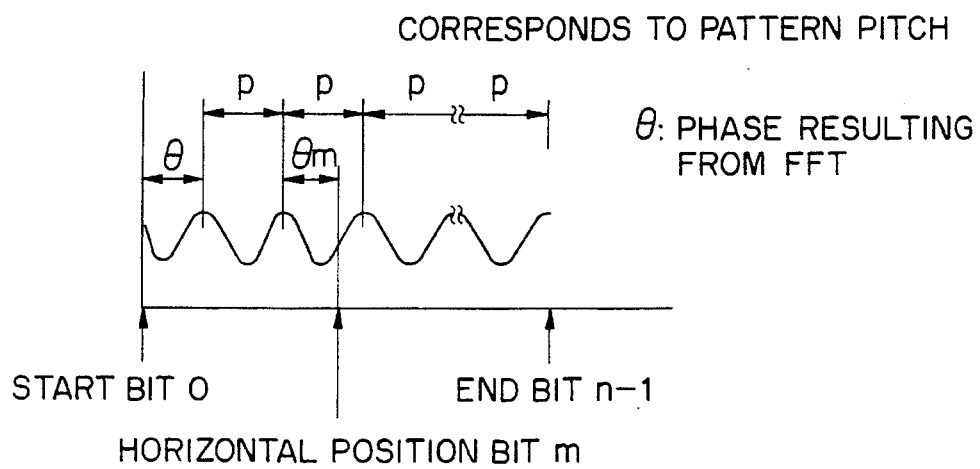

The first case is the long-distance leveling. The Fourier transformation for the output signal of the linear sensor 15 produces a signal which reflects the pattern pitch p, as shown in FIG. 14. For a phase $\theta$ resulting from the Fast Fourier transformation and a phase $\theta_m$ at the position on the linear sensor 15 (the m-th bit) which corresponds to the horizontal position, the horizontal position $H_1$ within the pitch p can be calculated accurately as follows (fine measurement).

$$H_1 = (\theta_m/360°) \times p \quad (5)$$

In order to measure the horizontal position, it is necessary to obtain the approximate position of the pitch p counted from the pattern starting position on the leveling staff 2. Initially, the output signal of the linear sensor 15 is integrated for the former and latter half pitches of the reference signal (it corresponds to the pattern pitch p). Extracting the integrated value at every third pulse (product detection) produces a signal 1 for the first pattern A, a signal 2 for the second pattern B and a signal 3 for the third pattern R, as shown in FIG. 15. The third pattern R of 8 mm is not modulated, whereas the first pattern A and second pattern B are modulated in a depth of 10 mm, and therefore the third pattern signal 3 having a virtually constant integrated value has a level of about 80% with respect to the signals 1 and 2.

Since the third pattern R, first pattern A and second pattern B are placed in a predetermined order cyclically, each extracted signal can be identified among the patterns. In order to remove the influence of optical disturbances such as the shading, differential signals A–R and B–R are produces on the basis of the signal of third pattern R, as shown in FIG. 16.

Subsequently, by selecting a set of signals R, A–R and B–R including the reference signal which includes the bit position (m-th bit) on the linear sensor 15 corresponding to the horizontal position and evaluating the phases of the A–R and B–R signals, it is possible to determine at which position on the leveling staff 2 is the combination of the first pattern A, second pattern B and third pattern R derived from.

For the A–R signal of level Am having a half-peak amplitude Wa and the B–R signal of level Bm having a half-peak amplitude Wb, these signals A–R and B–R have their phases expressed as follows.

$$\phi_a = \sin^{-1}(Am/Wa) \quad (60)$$

$$\phi_b = \sin^{-1}(Bm/Wb) - 2 \times \pi(10/570) \quad (70)$$

The reason for the second term of the expression (70) is that the position of the signal for the second pattern B has a 10 mm shift from that of the first pattern A.

By putting the expressions (60) and (70) into the expression (3), the horizontal position on the leveling staff 2 for the signal of the first pattern A can be calculated. In case the reference signal including the horizontal position belongs to the third pattern R, 10 mm is subtracted from the calculated horizontal position, or in case it belongs to the second pattern B, 10 mm is added to the calculated horizontal position. As a result, the approximate level $H_2$ of the horizontal position is obtained (coarse measurement).

In summary, the level H is measured by evaluating the phase of the reference signal at the horizontal position (fine measurement), determining the position of the reference signal for the horizontal position with respect to the pattern starting position on the leveling staff 2 based on the phase difference between the first pattern A and second pattern B (coarse measurement), and merging the fine measurement result $H_1$ and coarse measurement result $H_2$.

Next, the case of the short-distance measurement will be explained. Clear images of the first pattern A, second pattern B and third pattern R are produced in this case, and therefore more accurate leveling is expected through the direct measurement of the signal amplitude, instead of the product detection following the Fourier transformation which is the case of the long-distance measurement.

Figure 17:
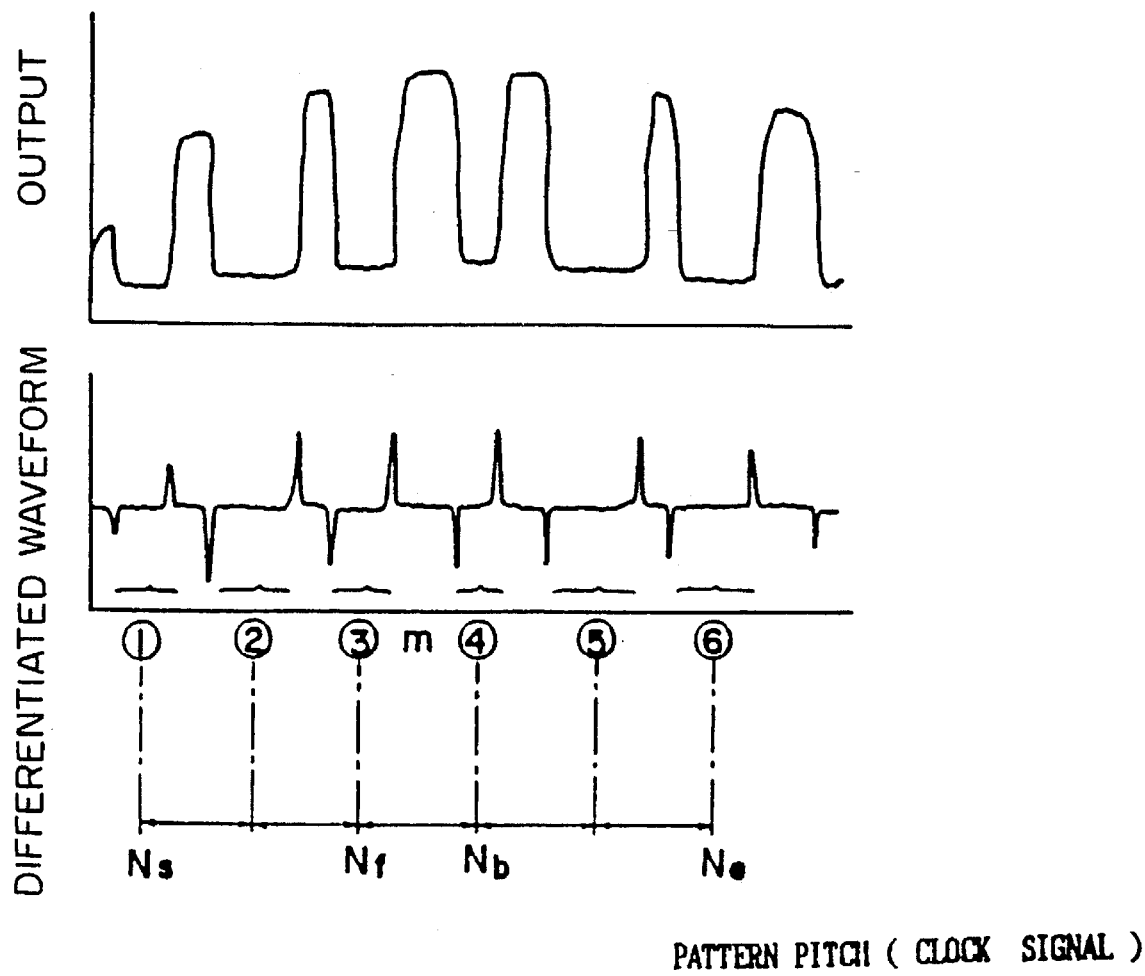
FIG. 17 is a diagram explaining the principle of short-distance measurement based on the first embodiment of invention.

Initially, the output signal of the linear sensor 15 is differentiated thereby to detect the rising edges and falling edges of the signal, as shown in FIG. 17. The width of black section of each pattern can be evaluated from the edges of the signal. Next, the central bit position of each black section is determined. A signal which represents the bit interval becomes the reference signal reflecting the constant pitch p of the first pattern A, second pattern B and third pattern R.

Since the period of the reference signal corresponds to 10 mm on the leveling staff 2, the positions of reference signals $N_f(N_f$-th bit) and $N_b$ ($N_b$-th bit) at the front and back of the bit position (m-th bit) for the horizontal position (fine measurement) are expressed as follows.

$$H_1 = ((m - N_f)/(N_b - N_f)) \times 10 \quad (80)$$

For reference signals of n in number between the start position $N_s$ and end position $N_e$, the average interval k of reference signals is calculated by $$k = (N_e - N_s)/n$$

By putting the resulting value of k into the expression (4), the approximate distance between the electronic level 1 and leveling staff 2 can be obtained.

By extracting every third black section from the beginning and recognizing the third pattern R which is constant in width among the orderly alignment of the third pattern R, first pattern A and second pattern B, the correspondence of the extracted sections to the patterns R, A and B is determined.

Subsequently, determination is made as to which pattern among R, A and B and which pattern block does the reference signal that includes the bit position (m-th bit) of the linear sensor 15 for the horizontal position belong, e.g., the n-th block in the case of R(n), A(n) and B(n).

By substituting the $$D_A = 5 \ast (1 + \text{SIN}(2 \ast \pi \ast Xa/600 - \pi/2)) \quad Xa = 30 \times n + 10$$

to the expression (1) for $D_A$, the value of n can be calculated from the $D_A$ as follows.

$$n = (10/\pi) \times (\phi_a + (\pi/2)) - (\frac{1}{3}) \quad (90)$$

$$\phi_a = \sin^{-1}((D_A/5) - 1)$$

One of two values of $\phi_a$ existing between 0 and $2\pi$ is selected based on the condition that n is an integer. This pattern block, with a block number na being given, exists at a 600 mm interval (i.e., every 20th block) on the leveling staff 2, and the n is calculated by $$n = 20 \times d + na$$

where d takes 0, 1, 2, 3, and so on.

The width $D_B$ of the second pattern B is calculated by using the resulting value of n.

By substituting the $$X = 30 \times n + 20$$

to the expression (2) and comparing the $D_B$ with the above calculation results of $D_B$, the block number n at which both $D_B$ values coincide is detected. The approximate level $H_2$ (coarse measurement) is calculated in one of the following three cases depending on as to which of the third pattern R, first pattern A and second pattern B do the determined n and m belong.

For the third pattern R: $H_2 = 30 \times n$

For the first pattern A: $H_2 = 30 \times n + 10$

For the second pattern B: $H_2 = 30 \times n + 20$ (100)

Through the determination based on a few additional sets of patterns at the front and back of the inherent pattern set, the measurement error caused by a contaminated scale can be minimized.

In summary, the level H is obtained by producing the reference signal from the width of black sections of patterns R, A and B and determining a reference signal for the bit position corresponding to the horizontal position thereby to obtain a fine measurement result $H_1$, obtaining a coarse measurement result $H_2$ based on the phase difference between the signals of the first pattern A and second pattern B, and merging the fine measurement result $H_1$ and coarse measurement result $H_2$.

Although the foregoing measuring method is designed to distinguish signals of the modulated first pattern A and second pattern B based on the unmodulated third pattern R, the measurement without using the third pattern R is possible if the first pattern A and second pattern B can be identified based on other scheme, such as detecting the wavelengths of sensor output signals derived from both patterns.

Next, the computation means 16 incorporated in the electronic level 1 will be explained in detail. In FIG. 1, the amplifier 161 amplifies the signal produced by the linear sensor 15, and the sample-holding circuit 162 samples and holds the amplified signal in response to the timing signal provided by the clock driver 165. The A/D converter 163 converts the voltage signal held by the sample-holding circuit 162 into digital data, the RAM 164 stores the data, and the microcomputer 166 implements various computational processings.

The objective lens set 11, compensator 12, beam splitter 13 and eyepiece set 14 constitute a telescopic optical system, and the linear sensor 15 constitutes an opto-electric transducer.

Figure 5:
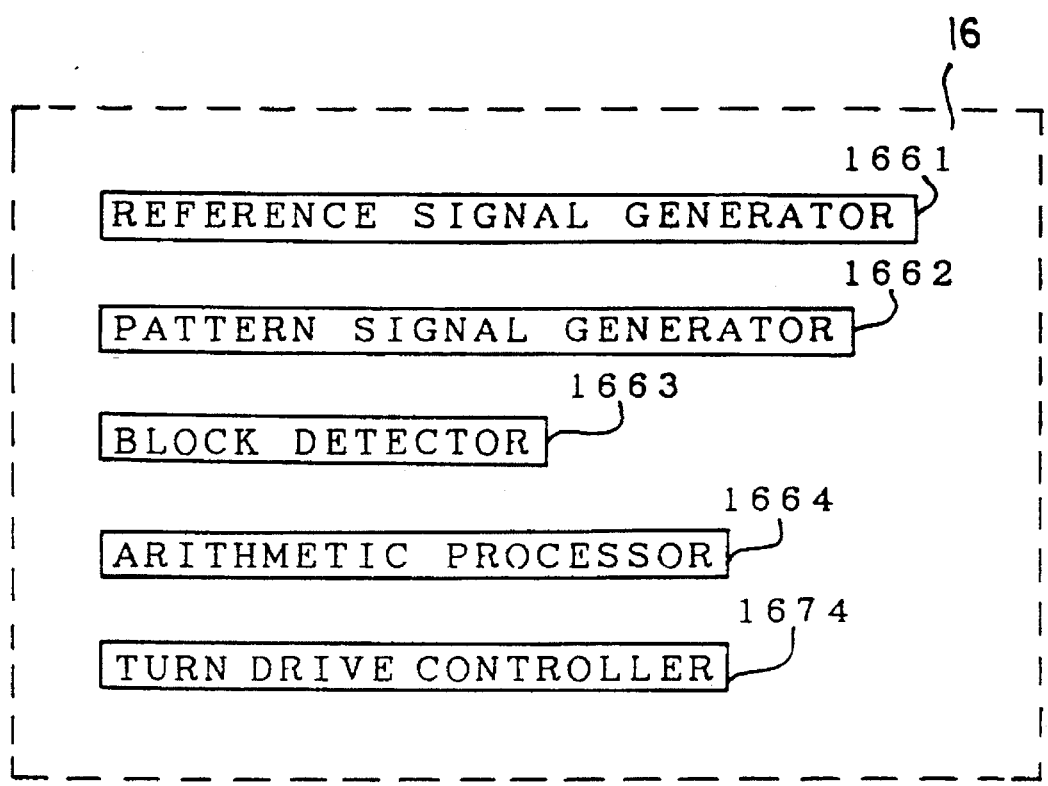
FIG. 5 is a diagram showing the arrangement of the computation means 16 of this embodiment.

The functions of the microcomputer 166 will be explained with reference to FIG. 5. The computation means 16 is made up of functional blocks, which are a reference signal generator 1661, a pattern signal generator 1662, a block detector 1663, an arithmetic processor 1664 and a turn drive controller 1674.

The reference signal generator 1661 produces a reference signal that corresponds to the pattern pitch p through the fast Fourier transformation in the case of the long distance measurement, or produces a reference signal based on the rising edge and falling edge of the output signal of the linear sensor 15 through the differentiating operation for the signal in the case of the short distance measurement.

The pattern signal generator 1662 integrates the linear sensor output for the former and latter half pitches of the reference signal and extracts every third integrated value (product detection) thereby to produce a first pattern signal and second pattern signal in the case of the long distance measurement, or produces the first pattern signal and second pattern signal directly through the extracting operation in the case of the short distance measurement.

The block detector 1663 compares the length $D_A$ of the first pattern A with the length $D_B$ of the second pattern B thereby to determine the block position in the case of the short distance measurement. The arithmetic processor 1664 calculates the height difference based on the phases of the first pattern signal and second pattern signal at the sight line in the case of the long distance measurement, or calculates the height difference based on the determined block in the case of the short distance measurement.

Figure 7:
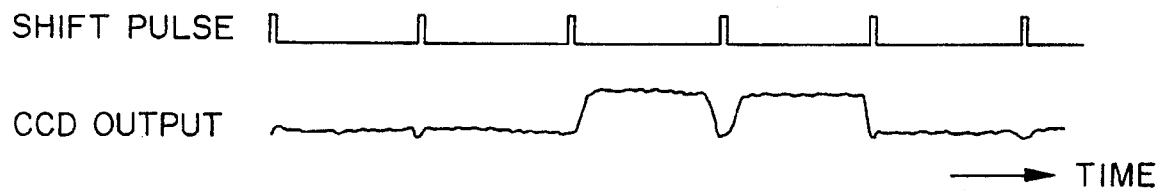
FIG. 7 is a waveform diagram used to explain the output signal of the light reception means 7000.

The turn drive controller 1674 controls the turning drive means 8000 in accordance with the received signal provided by the light reception means 7000 so that the electronic level 1 is oriented to the leveling staff 2. The turning drive means 8000 turns the electronic level 1 for one revolution, and when the light beam emitted by the light emission means 6000 of the electronic level 1 is reflected by the reflective strip 23 on the leveling staff 2 and is incident to the light reception means 7000, the linear sensor 15 produces an increased output as shown in FIG. 7. Accordingly, by halting the operation of the turning drive means 8000 at a high output of the photosensitive element 7100, the electronic level 1 can be oriented to the leveling staff 2.

The computation means 16 also serves as a distance measuring device, and it calculates the approximate horizontal distance between the electronic level 1 and leveling staff 2 based on the principle explained previously. The display device 167, which may be a liquid crystal device, displays the height difference calculated by the arithmetic processor 1664. The calculation result may be delivered to an external memory device or the like.

Figure 8:
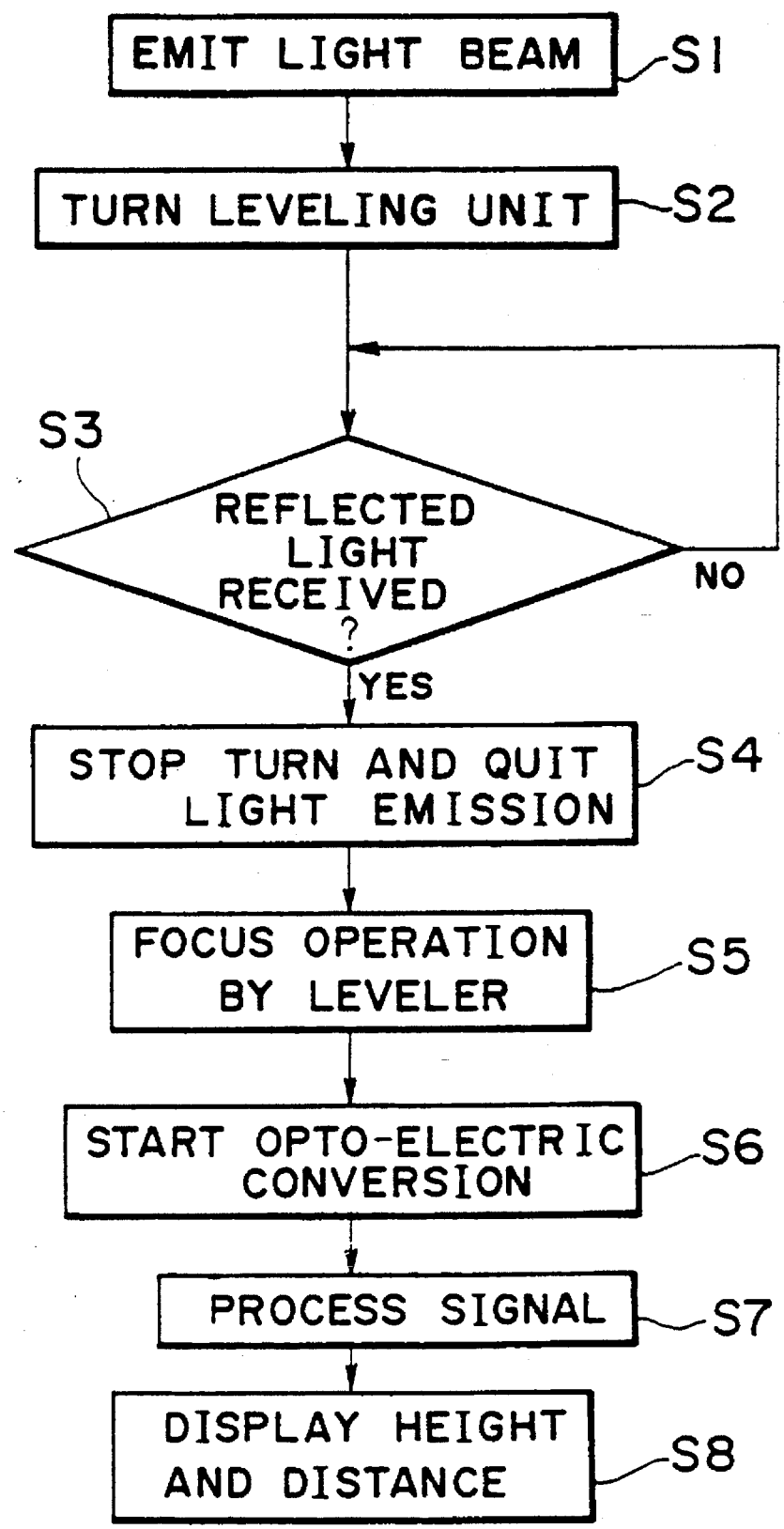
FIG. 8 is a flowchart used to explain the operation of this embodiment.

The operation of this embodiment arranged as described above will be explained with reference to FIG. 8.

At the first step S1, the light emission means 6000 is activated to emit a light beam from the LED 6200 to the outside. In the next step S2, the turning drive means 8000 is activated to turn the electronic level 1. In step S3, it is judged through the detection of an increased output of the photosensitive element 7100 as to whether the reflected light beam from the reflective strip 23 on the leveling staff 2 is incident to the light reception means 7000. On detecting the incident of the reflected light beam in step S3, the operation proceeds to step S4 to halt the turning drive means 8000 and fix the electronic level t. Otherwise, the turning drive means 8000 is kept operating to turn the electronic level 1 until the incident of the reflected light beam is detected in step S3.

In step S5, the leveler adjusts the objective lens set 11 manually so that the pattern 21 for electronic reading on the leveling staff 2 is in-focus. Subsequently, the signal produced by opto-electric conversion by the linear sensor 15 is fed to the computation means 16 in step S6. The arithmetic processor 1664 of the computation means 16 is activated to calculate the height difference and horizontal distance in step S7, and the calculated height difference and horizontal distance are displayed on the display device 167 in step S8.

Figure 9:
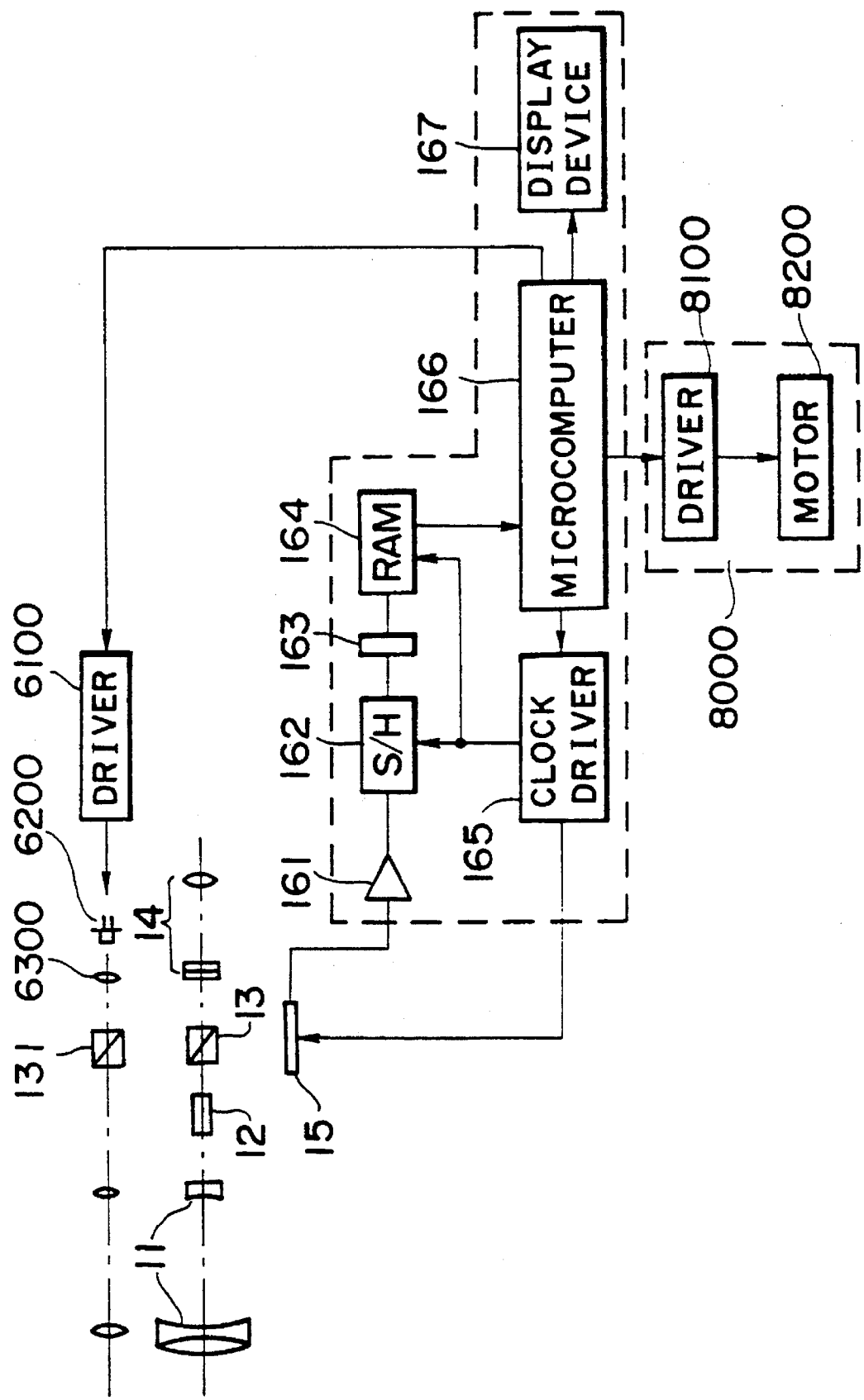
FIG. 9 is a block diagram showing a variant embodiment of the electronic level 1.

Next, a variant embodiment derived from the foregoing embodiment will be explained with reference to FIG. 9. The linear sensor 15 is used commonly for the role of the light reception means 7000 that is provided independently in the previous embodiment. The reflected light beam from the reflective strip 23 on the leveling staff 2 is diverted by the beam splitter 131, conducted through another beam splitter 130, and incident to the linear sensor 15.

This variant embodiment reduces the number of component parts and thus reduces the cost of the apparatus. The remaining arrangement is identical to the previous embodiment, and explanation thereof is omitted.

Figure 10:
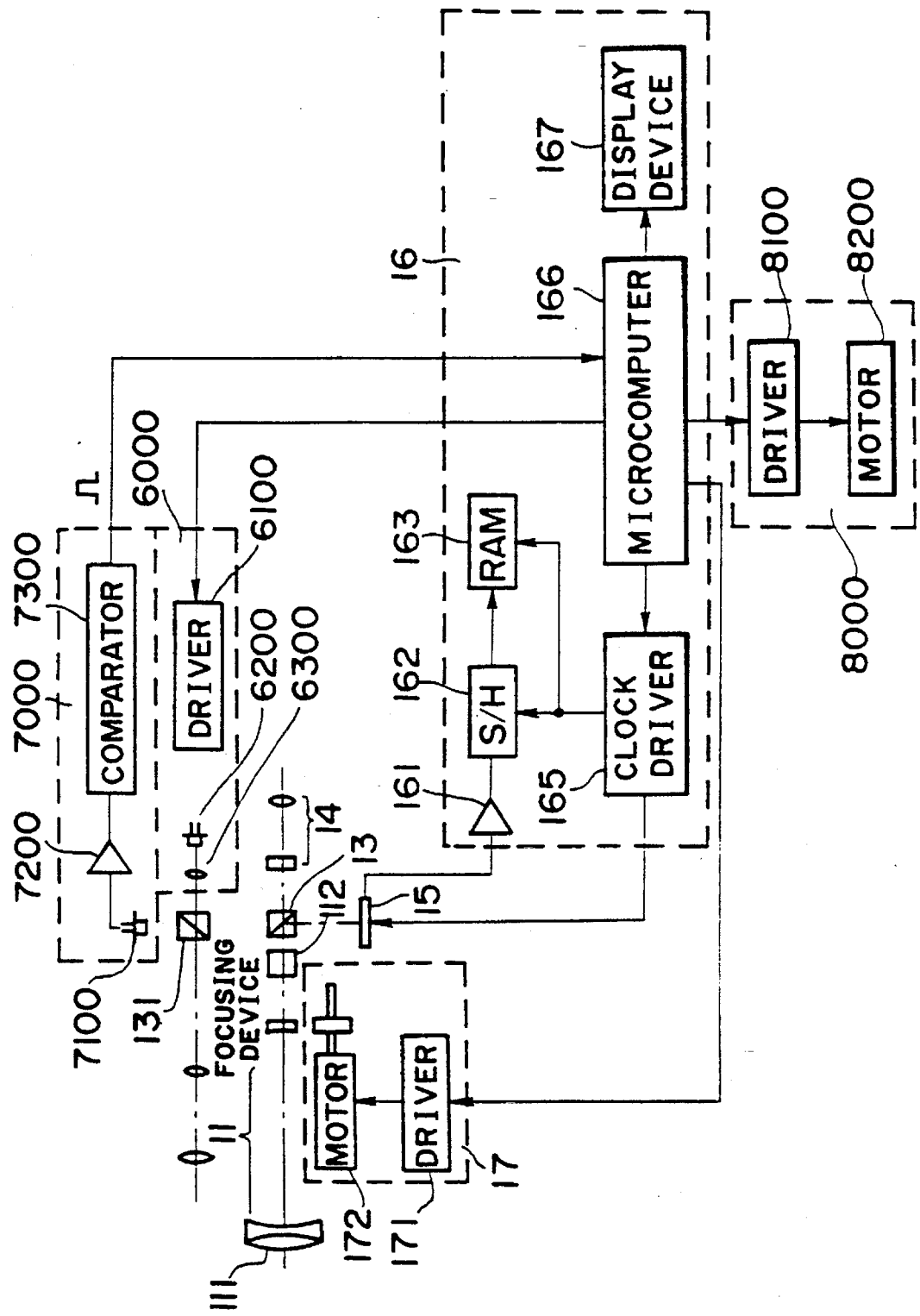

Next, the electronic level with automatic focusing function based on the second embodiment of this invention will be explained with reference to FIG. 10. The apparatus consists of an optical system including an objective lens set 11, a compensator 12, a beam splitter 13 and an eyepiece set 14, a linear sensor 15, a computation means 16 a focusing driver 17, a light emission means 6000, a light reception means 7000 and a turning drive means 8000.

The objective lens set 11 consists of an objective lens 111 and an internal lens 112 which is moved to focus the image of the pattern on the leveling staff 2. The internal lens 112 and focusing driver 17 constitute a focusing device.

Figure 11:
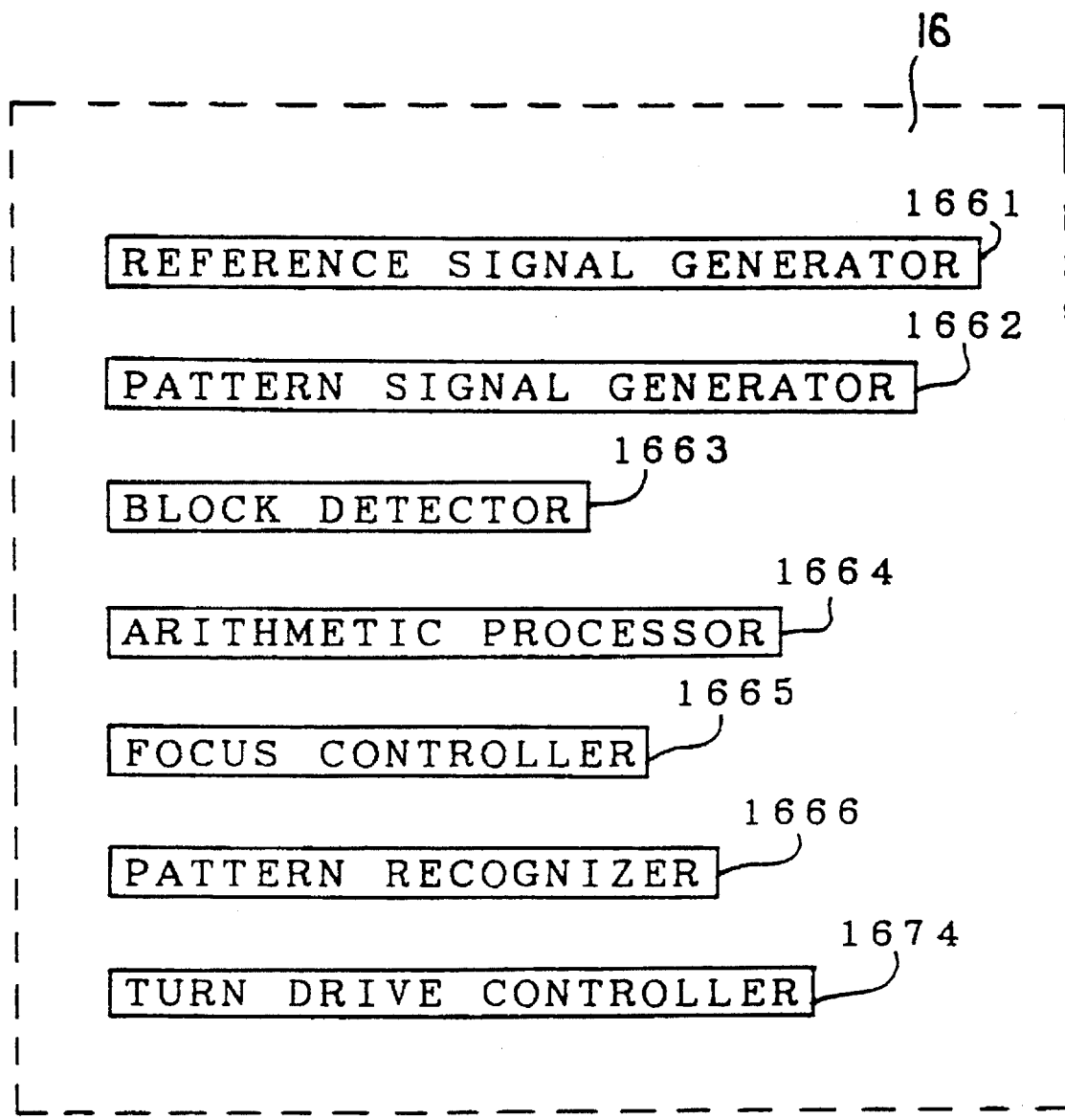
FIG. 11 is a block diagram showing the arrangement of the computation means 16 of the second embodiment.

The functions of the microcomputer 166 will be explained with reference to FIG. 11. The computation means 16 is made up of functional blocks, which are a reference signal generator 1661, a pattern signal generator 1662, a block detector 1663, an arithmetic processor 1664, a focus controller 1665, a pattern recognizer 1666, and a turn drive controller 1674.

The focus controller 1665 implements the Fourier transformation for the signal produced by the linear sensor 15 and operates on the focusing driver 17 such that the output of Fourier transformation is maximum. The fast Fourier transformation function of the reference signal generator 1661 is used for this operation. The computation means 16 includes the function of a signal processor.

The pattern recognizer 1666 is intended to search for a power spectrum pattern of the pattern image of the leveling staff 2 based on the pattern matching process.

The focusing driver 17, which consists of a driver 171 and a second motor 172, moves the internal lens 112 along its optical axis through a gear mechanism 173 provided on one end of the drive shaft of the second motor 172 as shown in FIG. 3. A knob 174 used to move the internal lens 112 manually for focusing the pattern image is fitted on another end of the motor drive shaft.

The focusing driver 17 operates to move the internal lens 112 in accordance with the calculation result provided by the focus controller 1665 of the computation means 16. Although the gear mechanism 173 is used for the focusing driver 17 in this embodiment, any other drive means such as a ultrasonic motor may be employed to reciprocate the internal lens 112.

Figure 4:
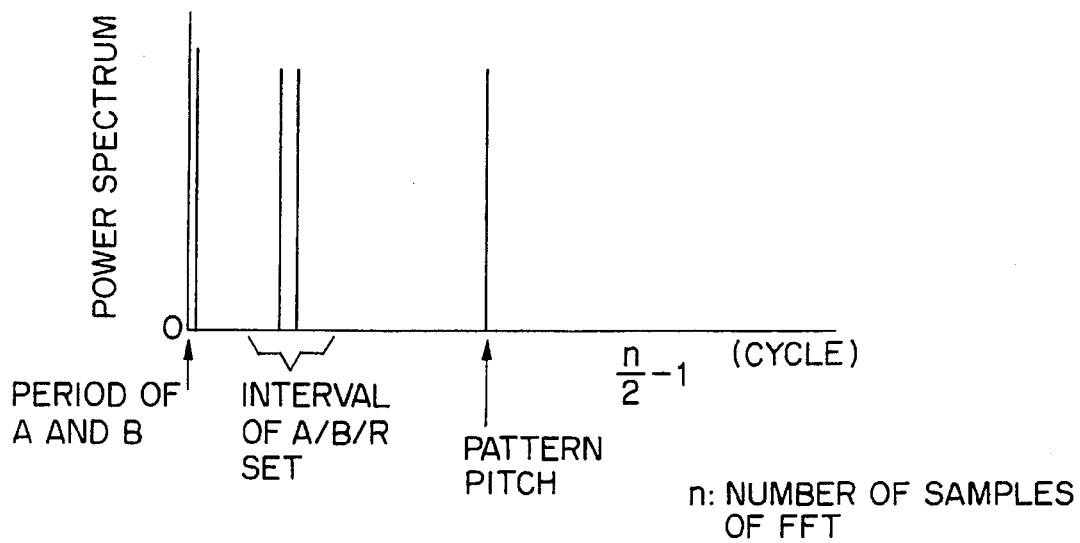
FIG. 4 is a graph showing the power spectrum of the output signal based on the first embodiment.

The principle of focusing control by the focus controller 1665 will be explained. The leveling staff 2 has a pattern arrangement at a constant pitch p, with each mark being modulated in terms of the length. The linear sensor 15, which is a one-dimensional sensor, reads the pattern, and the output signal is rendered the Fourier transformation to produce a power spectrum as shown in FIG. 4. The power spectrum has peaks at:

$$nh/(p/d \times f) \text{ cycle/n bit}$$

where p is the pattern pitch of the leveling staff 2, d is the distance between the electronic level 1 and leveling staff 2, f is the focal distance of the optical system of the electronic level 1, n is the number of bits of the one-dimensional sensor used for Fourier transformation, and h is the bit pitch of the sensor.

The peak level falls as the lens position goes out of focus. Accordingly, the focusing operation is carried out while monitoring the peak level, and the optical system is brought to the in-focus state by detecting the peak level.

Figure 12:
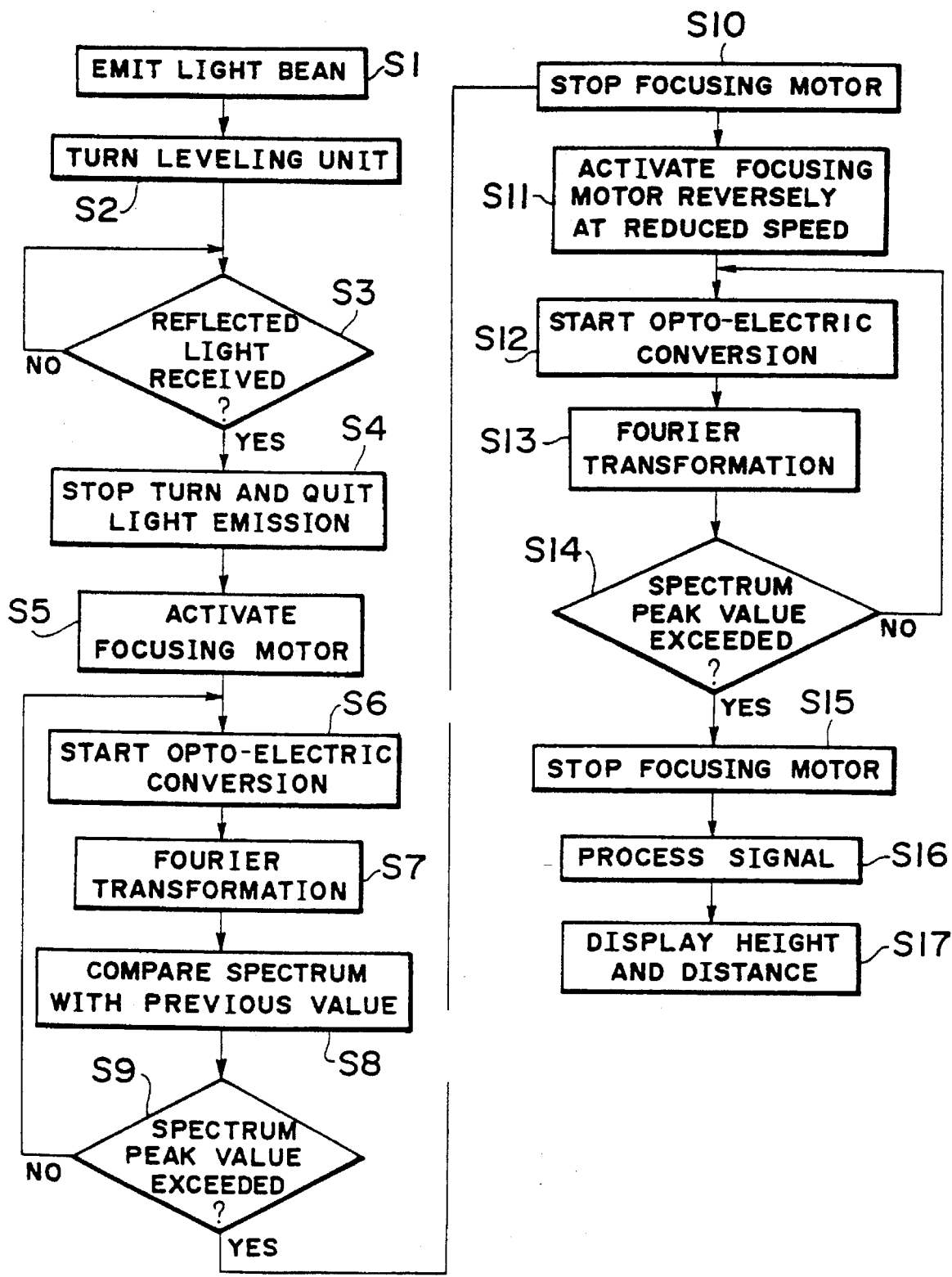
FIG. 12 is a flowchart used to explain the operation of the second embodiment.

The operation of the second embodiment arranged as described above will be explained with reference to FIG. 12.

At the first step S1, the light emission means 6000 is activated to emit a light beam from the LED 6200 to the outside. In the next step S2, the turning drive means 8000 is activated to turn the electronic level 1. In step S3, it is judged through the detection of an increased output of the photosensitive element 7100 as to whether the reflected light beam from the reflective strip 23 on the leveling staff 2 is incident to the light reception means 7000. On detecting the incident of the reflected light beam in step S3, the operation proceeds to step S4 to halt the turning drive means 8000 and fix the electronic level 1. Otherwise, the turning drive means 8000 is kept operating to turn the electronic level 1 until the incident of the reflected light beam is detected in step S3.

In step S5, the focus controller 1665 of the computation means 16 activates the focusing driver 17 to move the internal lens 112 from its infinity position toward the nearer position at a constant speed. The computation means 16 fetches data from the linear sensor 15 in step S6, implements the Fourier transformation for the data in step S7, and compares the result with the previous value. In step S9, it is judged whether or not the output level of the Fourier transformation has passed the peak value. If the passage of the peak value is detected in step S9, the sequence proceeds to step S10, in which the focus controller 1665 operates on the focusing driver 17 to stop the internal lens 112, or otherwise the sequence returns to step S6.

After the internal lens 112 is stopped in step S10, the focus controller 1665 operates on the focusing driver 17 to move the internal lens 112 from the previous position toward the infinity position at a reduced speed. In the next step S12, data is fetched from the linear sensor 15, and it is rendered the Fourier transformation by the computation means 16 in step S13. Step S14 compares the result with the previous result thereby to judge whether or not the output level of Fourier transformation has passed the peak value. On detecting the passage of the peak value in step S14, i.e., the detection of in-focus state, the focus controller 1665 operates on the focusing driver 17 to stop the internal lens 112 in step S15, or otherwise the sequence returns to step S12 to continue the focusing operation.

After the internal lens 112 is stopped, the sequence proceeds to steps S16, in which the arithmetic processor 1664 of the computation means 16 implements the calculation of height difference and horizontal distance, and the resulting height difference and horizontal distance are displayed on the display device 167 in step S17.

As explained above, the second embodiment performs the focusing control through the detection of the maximum value of the Fourier transformation output. The remaining portion is identical to the first embodiment, and explanation thereof is omitted.

The present invention arranged as described above resides in an electronic level apparatus which turns to the leveling staff having a a reflective strip that reflects a light beam in the direction opposite to the incident direction and measures the height difference and horizontal distance between the two positions automatically. The measuring optical system including a telescopic optical system and opto-electric transducer, and the focusing device operate in unison to form an image of the pattern of the leveling staff. The light emission means including a light emitting optical system emits a light beam to the outside, the light reception means receives the reflected light, and the turning drive means turns the apparatus on a horizontal plane. The signal processor controls the turning drive means in response to the light signal reception by the light reception means and implements the computational process for the output of the opto-electric transducer thereby to calculate the height difference and horizontal distance to the leveling staff. Consequently, the electronic leveling apparatus can be set to face the leveling staff automatically, which allows the leveler to sight the leveling staff immediately after it is moved to the next position, whereby the efficiency of leveling work is improved.

It is also possible for the arrangement of this invention to use a single device for the opto-electric transducer and the light reception means.

In this invention, the focusing device forms an image of the pattern on the opto-electric transducer, the signal processor processes the output signal of the transducer to calculate the height difference and horizontal distance to the leveling staff, and the focus controller controls the focusing device based on the output level of Fourier transformation provided by the signal processor. Consequently, the optical system is brought to the in-focus state automatically, and the leveling work can be sped up. The automatic focus control based on this invention requires only addition of the focusing driver in the focusing device, instead of needing another focusing unit, whereby a simple and inexpensive apparatus is accomplished.

The leveling staff based on this invention has the provision of a reflector along the longitudinal direction so that a light beam is reflected in the direction opposite to the incident direction.

The leveling staff based on this invention has the provision, along the longitudinal direction, of a measuring scale pattern of a constant pitch for electronic reading and a reflector for reflecting a light beam in the direction opposite to the incident direction.

What is claimed is:

1. An electronic leveling apparatus for measuring automatically the height difference and horizontal distance between said apparatus and a leveling staff through the operation of sighting said leveling staff which is provided with a reflector for reflecting a light beam in the direction opposite to the incident direction, said apparatus comprising: a telescopic optical system including an opto-electric transducer for producing an output signal that represents a pattern formed on said leveling staff; light emission means including a light emitting optical system for emitting a light beam to the outside; light reception means for receiving a reflected light of the light beam emitted by said light emission means; turning drive means for turning said apparatus in a horizontal plane; and a signal processor which controls said turning drive means in accordance with a signal provided by said light reception means and implements a computational process for the output signal of said opto-electric transducer thereby to calculate the height difference and horizontal distance between said apparatus and said leveling staff.

2. An electronic leveling apparatus according to claim 1, wherein said opto-electric transducer and said light reception means are formed of a single photosensitive element.

3. An electronic leveling apparatus according to claim 1, wherein the telescopic optical system further comprises a focusing device for focusing an image of said pattern on said opto-electric transducer;

said signal processor further implements Fourier transformation for the output signal of said opto-electric transducer;

and the electronic leveling apparatus further comprises a focus controller which controls said focusing device in accordance with an output level of said signal processor.

4. A leveling staff having a formation, in the longitudinal direction thereof, of a pattern for electronic reading; and a reflector for reflecting a light beam in the direction opposite to the incident direction.

5. A leveling staff according to claim 4, wherein said pattern for electronic reading has a constant pitch.

* * * * *